(12) United States Patent
Spatscheck et al.

(10) Patent No.: US 8,724,198 B2
(45) Date of Patent: May 13, 2014

(54) OPTICAL POWER SWITCH (OPS)

(75) Inventors: Thomas Spatscheck, Tjorne (NO);
Vladimir Kartashov, Horten (NO); Jon Herman Ulvensoen, Asgardstrand (NO);
Lars Henriksen, Tonsberg (NO)

(73) Assignee: Polight AS, Horten (NO)

( * ) Notice: Subject to any disclaimer, the term of this patent is extended or adjusted under 35 U.S.C. 154(b) by 77 days.

(21) Appl. No.: 13/496,178

(22) PCT Filed: Sep. 13, 2010

(86) PCT No.: PCT/EP2010/063391
§ 371 (c)(1),
(2), (4) Date: May 22, 2012

(87) PCT Pub. No.: WO2011/029932
PCT Pub. Date: Mar. 17, 2011

(65) Prior Publication Data
US 2012/0229877 A1    Sep. 13, 2012

(30) Foreign Application Priority Data

Sep. 14, 2009 (EP) .................................... 09170178

(51) Int. Cl.
*G02B 26/08* (2006.01)
(52) U.S. Cl.
USPC .................................................... 359/196.1

(58) Field of Classification Search
USPC .......... 359/196.1–226.1, 228, 290, 291, 297, 359/296
See application file for complete search history.

(56) References Cited

U.S. PATENT DOCUMENTS

| | | | |
|---|---|---|---|
| 6,288,846 | B1 | 9/2001 | Stoner |
| 6,897,995 | B2 | 5/2005 | Malthe-Sørenssen et al. |
| 6,967,763 | B2 * | 11/2005 | Fujii et al. ..................... 359/297 |
| 2004/0179259 | A1 | 9/2004 | Fujii et al. |
| 2006/0152646 | A1 | 7/2006 | Schrader |

OTHER PUBLICATIONS

International Search Report for International Application No. PCT/EP2010/063391 mailed Dec. 3, 2010.

* cited by examiner

*Primary Examiner* — Euncha Cherry
(74) *Attorney, Agent, or Firm* — Pearl Cohen Zedek Latzer Baratz LLP

(57) ABSTRACT

The present invention is generally related to the field of optical systems and/or lens attachments, and more specific to an optical system and/or lens attachment providing a switchable Optical Power Switch (OPS) controllably switchable between different states. A soft transparent material (12), for example silicone-gel is disposed onto a surface of a glass plate (10). The glass plate (10) can be moved with actuators towards a surface of a lens body (10). When the soft material element (12) is in contact with the surface of the lens body (12), this surface changes its optical feature.

15 Claims, 8 Drawing Sheets

OPTICAL POWER SWITCH (OPS)

CROSS-REFERENCE TO RELATED APPLICATIONS

This application is a National Phase Application of PCT International Application No. PCT/EP2010/063391, entitled "OPTICAL POWER SWITCH (OPS)", International Filing Date Sep. 13, 2010, published on Mar. 17, 2011 as International Publication No. WO 2011/029932, which in turn claims priority from European Patent Application No. 09170178.9, filed Sep. 14, 2009, both of which are incorporated herein by reference in their entirety.

FIELD OF THE INVENTION

The present invention is generally related to the field of optical systems and/or lens attachments, and more specific to an optical system and/or lens attachment providing an Optical Power Switch (OPS) controllably switchable by controllably adapting a soft transparent material element as part of a lens or lens attachment or another type of optical element in an optical system.

BACKGROUND OF THE INVENTION

In prior art it is known how to change focal distance, magnification etc. of optical systems or lens attachments. Traditionally this is achieved either by moving at least one or a plurality of lenses in the system or by changing one or several lens shapes in the optical system, as known to a person skilled in the art.

However, mechanical movements in optical systems usually needs relatively large mechanical swings which are contrary to the needs of many modern applications of optical systems, for example as used in mobile phones, small handheld cameras, web cameras in portable computers etc. These systems must be compatible with micro system requirements as known to a person skilled in the art. Moving lenses needs relatively large movements which is a disadvantage especially when related to micro systems. There are also examples in prior art of continuous tuneable lenses, for example tuneable lenses using electro wetting or liquid crystal lenses. Typically, these systems need high driver voltages, however the range of optical power is limited and the optical aberration is changing when changing optical power of the optical system.

Other examples of optical systems that can provide OPS functionality is disclosed in U.S. Pat. No. 6,897,995, for example. A Tuneable Diffraction Grating (TDG) optical switch is disclosed that can switch light on and off. However, such devices are usually difficult to adapt to lens systems in a micro optical system and/or lens attachment.

Therefore, there is a need in the prior art for an OPS system that can switch relatively high optical effects with small mechanical movements and at the same time is not changing substantially optical parameters (for example aberration) of a lens system wherein the OPS is being used, and that the OPS is also adaptable to optical micro system needs.

Hence, an improved OPS device would be advantageous, and in particular a more efficient and/or reliable OPS device would be advantageous.

OBJECT OF THE INVENTION

It is a further object of the present invention to provide an alternative to the prior art.

In particular, it may be seen as an object of the present invention to provide an OPS device comprising optical components providing switching of relatively high optical power, >20 dpt, with small mechanical movements. In addition, lens profiles will be substantially preserved during operation of OPS devices according to the present invention.

SUMMARY OF THE INVENTION

Thus, the above described object and several other objects are intended to be obtained in a first aspect of the present invent by providing an OPS device comprising functionality for deactivating and/or activating or changing parameter values for optical features of an optical element surface (for example a lens surface) intersecting an optical axis in the optical system by pushing and/or withdrawing a soft optical material element like e.g. silicone-gel respectively to and from the surface of the optical element (lens).

According to an example of embodiment of the present invention, an optical element can be switched between an "on" state and an "off" state for light passing through the optical element. According to a further aspect of this example of embodiment, the optical element can switch a focal distance between a first defined value and a second defined value for the focal length.

According to another example of embodiment of the present invention, the switching of the OPS according to the present invention provides an optical zoom system.

According to another example of embodiment of the present invention, the switching of the OPS according to the present invention provides an optical macro system.

According to another example of embodiment of the present invention, the soft material element, for example the silicone-gel, has a same refractive index as the optical element material (for example a lens material). In this example of embodiment with a same respective refractive index the optical power can be switched and reduced substantially towards zero.

According to another example of embodiment of the present invention, the soft material element, for example the silicone-gel, has a different refractive index as the optical element material (for example a lens material). In this example of embodiment with a respective different refractive index the optical power can be switched between a first defined level and a second defined value dependent on which state of contact there is between the optical element and the transparent soft material element, for example full contacting or no contact at all, or the amount of areal overlap there is in the contact area between the optical element surface and the transparent soft material element surface.

According to another example of the present invention, it is possible to tune two different respective focal distance values when using a lens by using the lens surface on the far side of the soft material and the far side of the glass plate, respectively.

According to another example of embodiment of the present invention a lens body is made of a soft transparent material, for example silicone-gel, and is controllably pushed respectively withdrawn from a glass plate. Further, in a variant, the glass plate is pushed respectively withdrawn from the lens body.

According to another aspect of the present invention, the lens body can be any type of optical element. For example, in an embodiment a lens body is a scattering surface. When the scattering surface is pushed into contact with a soft transparent material element surface, the optical element in contact with the soft material element becomes a light transmitting element.

According to another aspect of the present invention, the lens body is an optical element comprising an irregular surface, for example a saw-tooth shaped surface, a rugged surface etc. that is respectively pushed into or withdrawn from contact with the soft transparent material element, thereby providing a different transmission of light through the optical system dependent on which state of contact there is between the optical element and the transparent soft material element, for example full contact or no contact at all, or the amount of areal overlap there is in the contacting area between the optical element surface and the transparent soft material element surface.

According to another aspect of the present invention, the optical element is a Fresnel lens.

According to another aspect of the present invention it is not required that the optical element and the soft material element has parallel surfaces. For example, in an embodiment according to the present invention, the optical element is a prism with a non-parallel surface relative to a contact surface of the soft material element. This provides a change of direction of light passing through the optical system dependent on which state of contact there is between the optical element and the transparent soft material element, for example full contact or no contact at all, or the amount of areal overlap there is in the contact area between the optical element surface and the transparent soft material element surface.

According to yet another aspect of the present invention, the optical element and the soft material element has parallel surface, but are not oriented perpendicular to the optical axis through the optical system. This provides a parallel shift of light passing through the optical system dependent on which state of contact there is between the optical element and the transparent soft material element, for example full contact or no contact at all, or the amount of areal overlap there is in the contact area between the optical element surface and the transparent soft material element surface.

These and other features of the present invention are set forth in the appended claim set. Some examples of embodiments of the present invention are illustrated in the attached figures which are only provided for illustration purposes and are not to be viewed as limiting the scope of the invention.

The individual aspects of the present invention may each be combined with any of the other aspects. These and other aspects of the invention will be apparent from the following description with reference to the described embodiments.

DETAILED DESCRIPTION OF EXAMPLES OF EMBODIMENTS

The individual elements of an embodiment according to the present invention may be physically, functionally and logically implemented in any suitable way such as in a single unit, in a plurality of units or as part of separate functional units. The present invention may be implemented in a single unit, or be both physically and functionally distributed between different units.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

An aspect of the present invent is to provide an OPS device comprising functionality for deactivating and/or activating or changing parameter values for optical features of an optical element surface (for example a lens surface) intersecting an optical axis in the optical system by pushing and/or withdrawing a soft optical material element like e.g. silicone-gel respectively to and from the surface of the optical element (lens).

Figure 1:
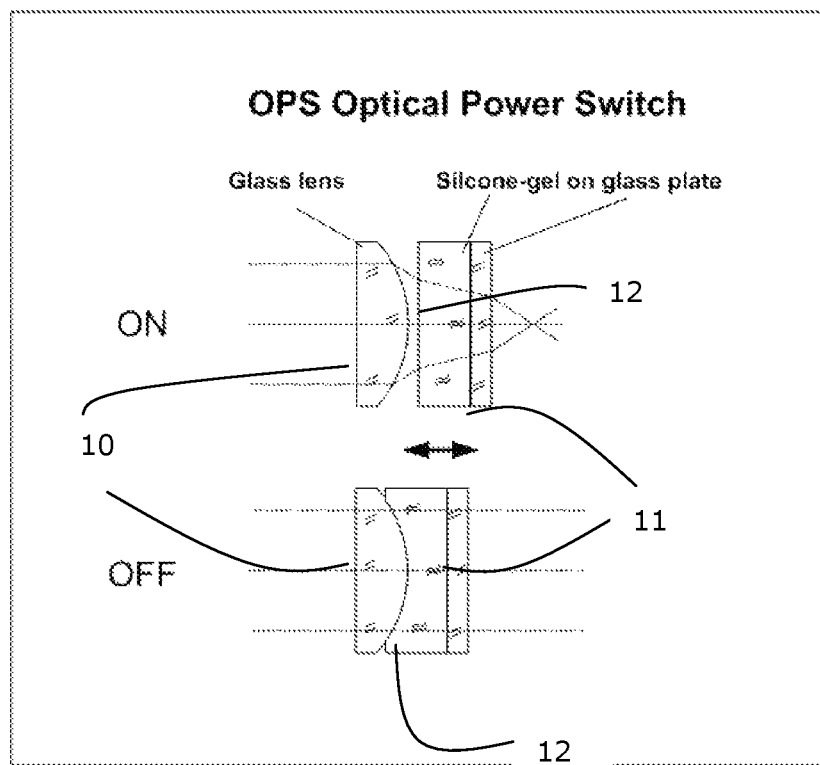
FIG. 1 illustrates an example of embodiment of the present invention.

According to an example of embodiment of the present invention, an OPS device is provided for by changing a surface shape of a lens, for example by levelling out a curved shape of a lens surface with for example a soft transparent material element, for example a transparent silicone-gel element, for example a cubic formed slice of a piece of a soft but cured silicone-gel element. This slice of soft silicone-gel can be deposited onto an optical transparent glass plate and be cured and remain soft after curing as known to a person skilled in the art. With reference to FIG. 1, a lens body 10 is located in front of an element of silicone-gel (or soft material element) 12 deposited onto a glass plate 11. The operation of the Optical Power Switch (OPS) according to the present invention, as exemplified in FIG. 1, is to move the glass plate 11 towards the lens body 10, for example by activating actuators with respective control signals, wherein the soft silicone-gel 12 is facing towards a curved surface of the lens body 10, wherein the surface of the lens body 10 intersects an optical axis of the lens body 10. When the refractive index of the silicone-gel and the lens body material is equal and the soft silicone-gel element is completely in contact with the lens surface, as depicted in FIG. 1, the optical effect of the combination of the lens body 10 and the soft silicone-gel 12 in contact with the lens body 10 surface, is to shift the focal length to infinity, as known to a person skilled in the art. The optical effect of this condition is that the optical power of light passing through the lens assembly in FIG. 1 is substantially zero. When the silicone-gel 12 is not at all in contact with the lens body 10 surfaces, the optical power of light passing through the lens assembly in FIG. 1 is defined by the optical properties of the total lens assembly the light is passing through and which the OPS system is part of.

It is also obvious that the amount of overlapping of the surface contact areas between the lens body surface 10 and the surface of the soft silicone-gel element 12 has an optical effect on the optical power of the light passing through the lens assembly. The value of the optical power of the light that passes is proportional to the amount of areal overlapping in the contact surface between the respective surfaces of the lens body 10 and the surface of the silicone-gel 12. Therefore, it is possible to tune the amount of optical power of the light passing through the lens assembly between a respective first level and a second level.

When the refractive index of the material of the lens body 10 and the silicone-gel 12 is equal, the first optical power level and the second optical power level as described above is equivalent to turning the OPS "on" or "off", respectively. When the respective refractive indexes of the lens body 10 and the silicone-gel element 12 is different, the OPS will switch between a respective first defined optical power level and a second defined optical power level. This is also equivalent to switch the lens assembly between a defined respective first focal length and a second focal length, respectively. It is also obvious from the description above that it is possible to control the focal length between the first defined value and the second value just by controlling the amount of areal overlapping there is in the contact surface between the surfaces of the optical lens body 10 and the soft material element or silicone-gel element 12.

According to another example of embodiment of the present invention it is possible to tune the respective two focal distance values by using the lens surface on the far side of the soft material element 12, for example the silicone-gel element described above, and/or the far side of the glass plate 12.

Figure 2:
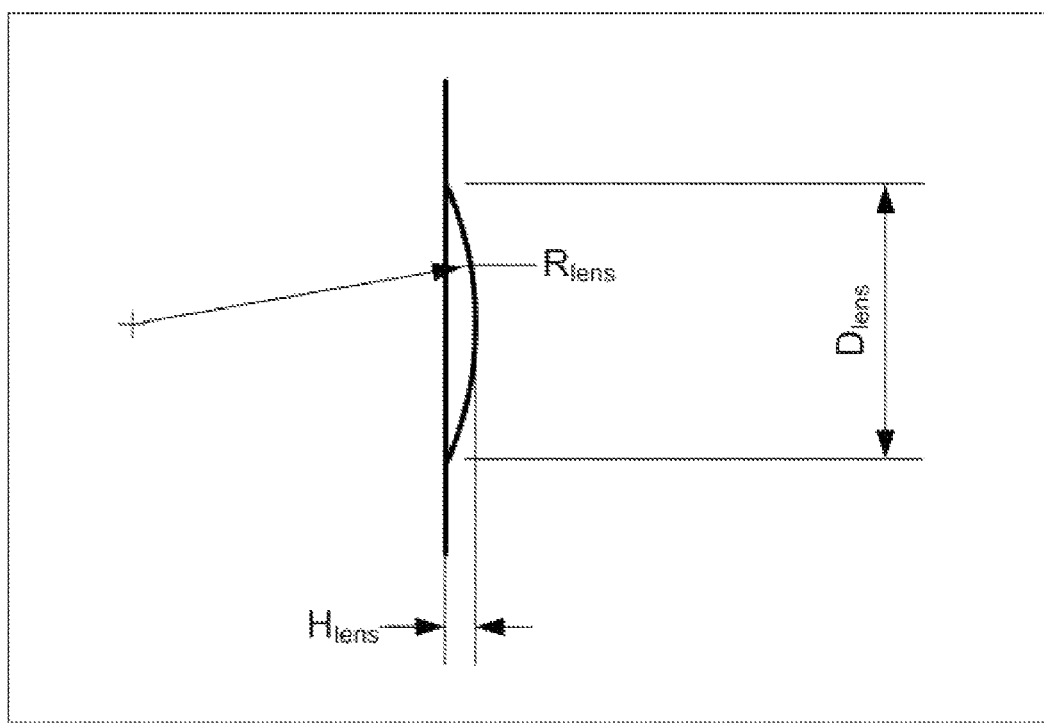
FIG. 2 illustrates an example of parameters of a design of an optical element according to the present invention.

With reference to FIG. 2 it is illustrated optical parameters that are related to designing a macro optical system, for example. A macro optical system is a term used when an optical system should be able to focus on objects very close to the optical system. In this example of embodiment of an OPS according to the present invention, 2 mm is used for the macro OPS lens diameter ($D_{lens}$=2 mm), for example a lens for use in a mobile telephone. A macro distance of f=50 mm is desired. This provides the following parameters derived from calculating the following equations known in prior art:

The height of the lens is given by:

$$H_{lens}R_{lens} - SQRT(R_{lens}^2 - (D_{lens}/2)^2) \quad (1)$$

Wherein $H_{lens}$ is the height of the lens, $R_{lens\ is}$ the radius of the lens body element and $D_{lens}$ is the diameter of the OPS element.

$$R_{lens} = 1/(1/((\eta-1)\cdot 1/f)) \quad (2)$$

$\eta$ is the refractive index of the lens body material.

For example, if $\eta$=1.5, f=50 mm equation (2) gives an $R_{lens}$=25 mm. Equation (1) gives the $H_{lens}$=0.020 mm.

However, in a practical situation or design of an OPS device according to the present invention, the soft material element 12, for example a silicone-gel element, will have a thermal expansion. Therefore it is necessary to compensate for the coefficient of thermal expansion for the material in use, for example the coefficient for the silicone-gel material at room temperature that is used and the temperature range that is expected to be present when using the optical element. For example, an operational environment with a Room Temperature RT+/−40° C. makes it necessary to add a certain additional value to the $H_{lens}$ parameter. In an example of embodiment of the present invention, wherein a silicone-gel is used, the additional space necessary to provide compensation for the thermal expansion of a 100 μm gel layer at these operational conditions is 0.006 mm. Therefore a movement of only 26 μm is necessary to provide a switching of states for the OPS between "on" or "off" respectively for a 50 mm macro lens assembly within a temperature range of for example −20° C. to +60° C.

This specific amount of movement of 26 μm is achievable within known Micro Electrical Mechanical System (MEMS) actuator systems or Piezo electric actuator systems, as known to a person skilled in the art.

Figure 3:
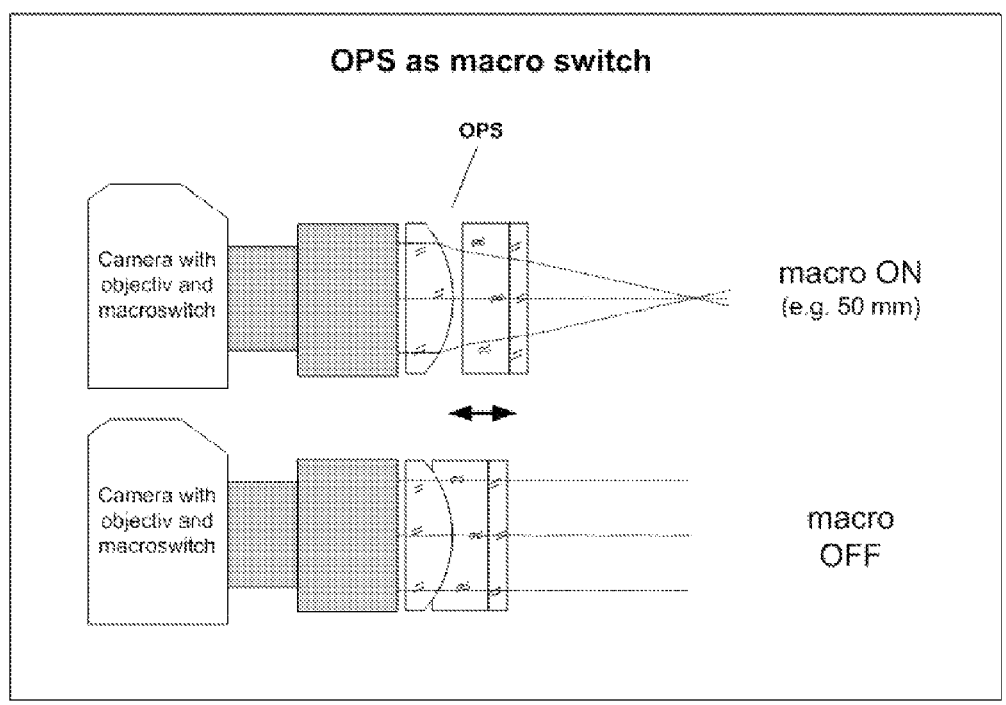
FIG. 3 illustrates an example of an optical macro switch according to the present invention.

An example of use of an OPS macro according to the present invention is depicted in FIG. 3.

Figure 4:
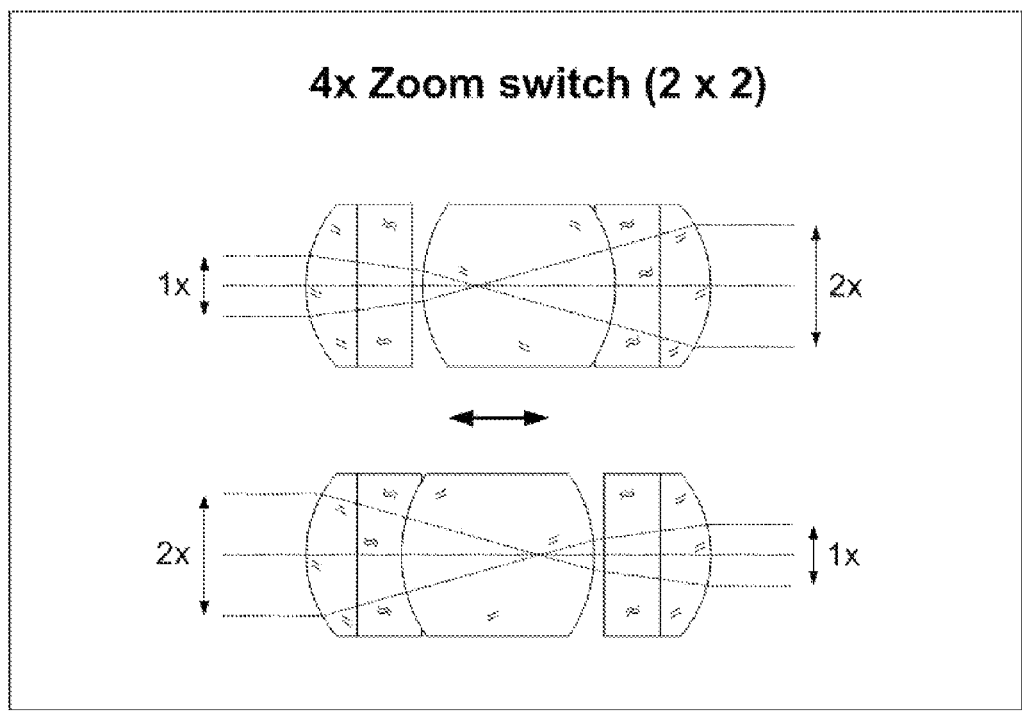
FIG. 4 illustrates an example of an optical zoom system according to the present invention.

It is within the scope of the present invention to use an OPS device in any optical configuration. Another example of use of an OPS device according to the present invention is illustrated in FIG. 4. This example illustrates how an OPS device according to the present invention can be used to control zooming operations in a lens assembly. The optical feature of the prism lens used in between the two OPS elements according to the present invention is known to a person skilled in the art. The function of the OPS is to switch "on" or "off" the zooming quantity given by the lens assembly. However, the controllable areal overlapping in the contacting surface between the OPS and the optical prism element in the middle makes it possible to adjust the amount of zooming, and not only switch "on" or "off" the zooming property.

Figure 5:
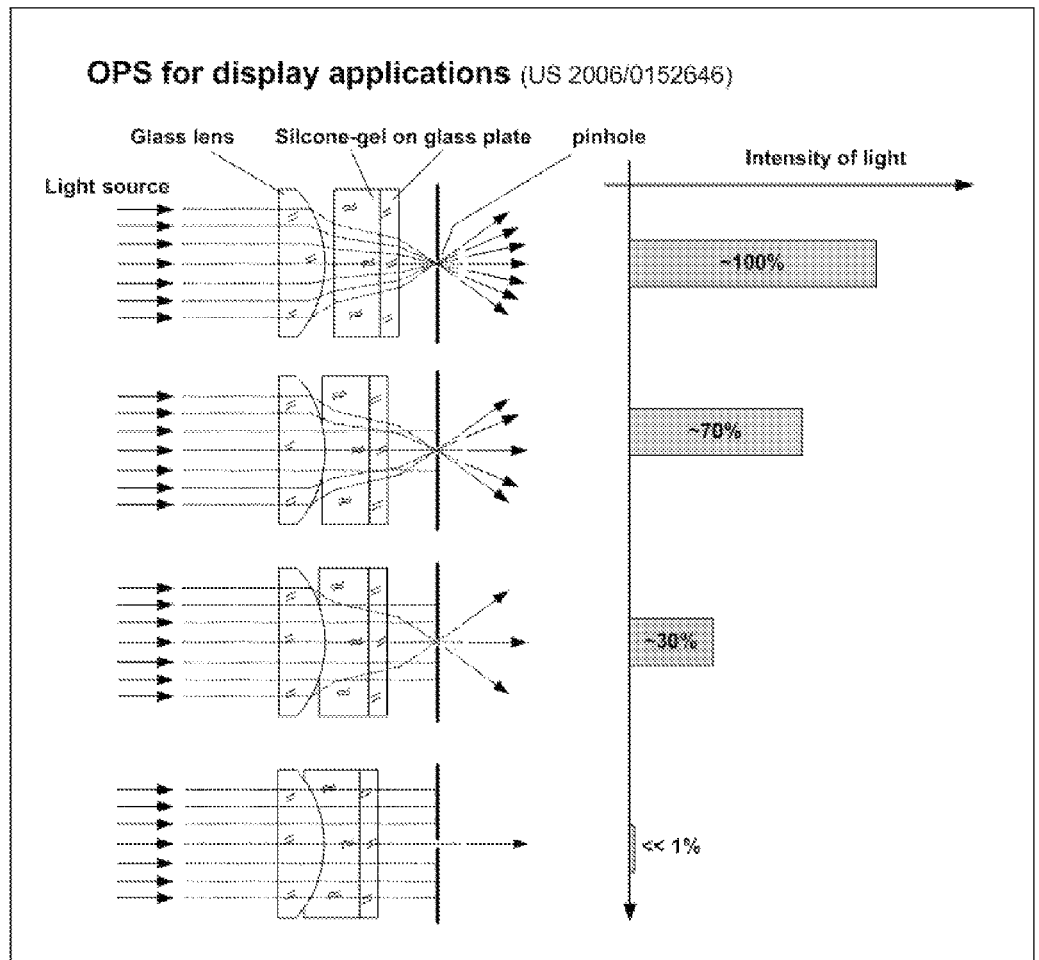
FIG. 5 illustrates an example of use in a display system of an example of embodiment of the present invention.

There are many other optical applications wherein the OPS according to the present invention can be used. In the patent application US2006/0152646 A1 it is disclosed a display system using a plurality of optical switches in combination with a plurality of pinholes. It is not within the scope of the present invention to disclose a display system. However, in FIG. 5 it is illustrated how simple a display system according to the disclosure in US2006/0152646 A1 can be made when using an OPS device according to the present invention to modulate light used in the display system.

Figure 6:
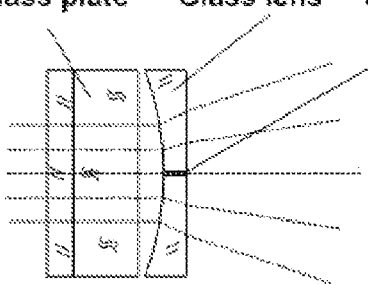
FIG. 6 illustrates another example of embodiment of the present invention comprising a concave lens.
Figure 6:
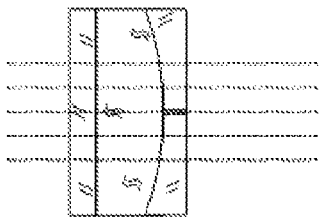

FIG. 6 illustrates that it is also possible to use concave shaped lens surfaces (contrary to the convex example in FIG. 1) in the lens body in an OPS according to the present invention. In this example of embodiment depicted in FIG. 6 there is also arranged a micro hole in the centre of the concave shaped lens body element. When operating the OPS, any air or gas trapped in between the soft material element and the concave shaped surface of the lens body will escape through this arranged micro hole.

Figure 7:
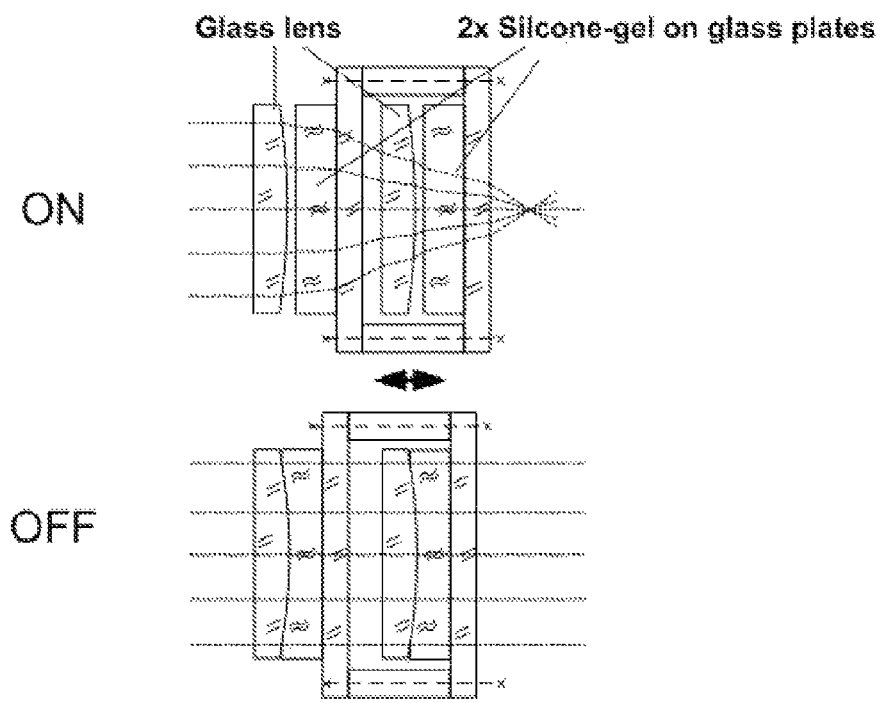
FIG. 7 illustrates an example of embodiment of the present invention comprising a multi stack of optical components.

FIG. 7 illustrates an example of embodiment of a stacked OPS device according to the present invention. Several OPS element can be used in the optical system, for example stacked as illustrated in FIG. 7.

Figure 8:
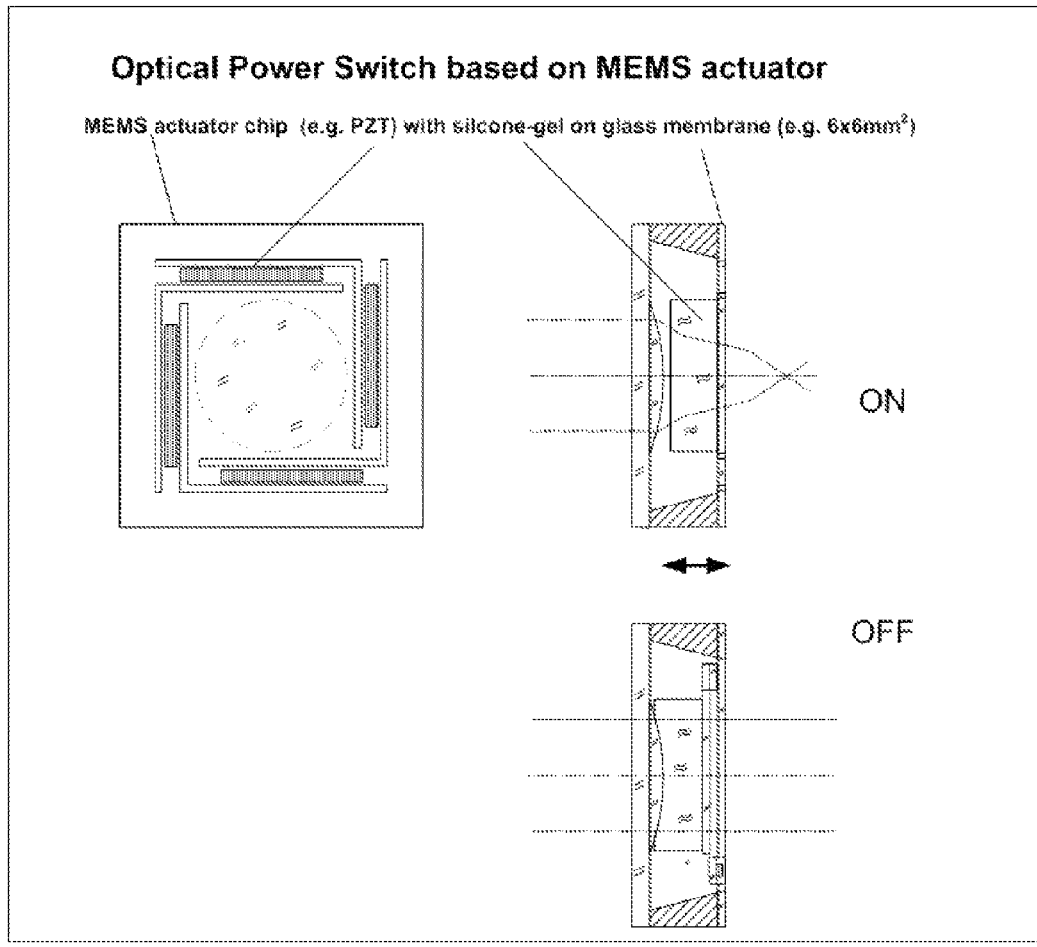
FIG. 8 illustrates an example of a Micro Electrical Mechanical System (MEMS) device according to the present invention.

FIG. 8 illustrates how MEMS actuators can be used in an OPS device according to the present invention. The illustration to the left depicts the arrangement of the actuators and the moving parts of the OPS. The movement is perpendicular to the paper surface. The illustration to the right is a cross section view of the OPS.

According to another example of embodiment of the present invention a lens body is made of a soft transparent material, for example silicone-gel, and is controllably pushed respectively withdrawn form a glass plate, for example by activating actuators. Further, in a variant, the glass plate is pushed respectively withdrawn from the soft lens body.

According to another aspect of the present invention, the lens body can be any type of optical element. For example, in an embodiment according to the present invention a lens body is a scattering surface. When the scattering surface is pushed into contact with a soft transparent material element the optical element in contact with the soft material element becomes in a light transmitting element.

According to another aspect of the present invention, the lens body is an optical element comprising an irregular surface, for example a saw-tooth shaped surface, a rugged surface etc. that is respectively pushed into or withdrawn from contact with the soft transparent material element, thereby providing a different transmission of light through the optical system dependent on which state of contact there is between the optical element and the transparent soft material element, for example full contact or no contact at all, or the amount of areal overlap there is in the contacting area between the optical element surface and the transparent soft material element surface.

According to another aspect of the present invention, the optical element is a Fresnel lens.

According to another aspect of the present invention it is not required that the optical element and the soft material element has parallel surfaces. For example, in an embodiment according to the present invention, the optical element is a prism with a non-parallel surface relative to a contact surface of the soft material element. This provides a change of direction of light passing through the optical system dependent on which state of contact there is between the optical element and the transparent soft material element, for example full contact or no contact at all, or the amount of areal overlap there is in the contacting area between the optical element surface and the transparent soft material element surface.

According to yet another aspect of the present invention, the optical element and the soft material element has parallel surfaces, but are not oriented perpendicular onto the optical axis of the light transmission through the optical system. This provides a parallel shift of light passing through the optical system dependent on which state of contact there is between the optical element and the transparent soft material element, for example full contact or no contact at all, or the amount of areal overlap there is in the contacting area between the optical element surface and the transparent soft material element surface.

The movement of either the optical element or the transparent soft material element (or both are movable) providing a contact between the respective surfaces of the optical element and the surface of the transparent soft material element, may be accomplished with many types of actuators as known in the prior art. It is within the scope of the present invention that any mechanism, device, assembly etc. that can be used in accordance with the principles of the present invention is covered by the appended claims. The examples of embodiments depicted in the drawings and in the text above are not limited to the use of specific actuator designs or types. Control signals that are applied on electronically controlled actuators can be signals with a certain voltage level above a threshold level that provides activation of the connected actuators. The amount of movement (i.e. how far the movement is or the swing of the movement) can be proportional to the voltage level as known to a person skilled in the art. In many applications of optical systems there is available a micro controller or micro processor system. For example, a mobile phone, a digital camera etc. has computing resources that can be programmed to provide a correct voltage level for activating a specific actuator type or design.

If the case is to provide a certain amount of areal overlapping of the contact area between the optical element surface and the transparent material element surface, a simple geometrical model of the surface of the optical element and the surface of the transparent material element may be used to identify the amount of movement that is necessary to provide in the system to achieve a certain level of areal overlapping. The type of actuator that is actually in use will then have a known relationship between applied voltage and displacement provided for by the actuator, and hence the necessary specific voltage that has to be applied on the actuator for a certain movement is identified correctly. This relationship can for example be stored in a look up table the computing element or processor can read from. The table can be indexed by numerical values indicating respective displacements, and in each indexed storage location a numerical value corresponding to the necessary voltage value to achieve the displacement is stored. When such a numerical value is read from the look up table, the computing element or processing element can transfer this value via signals directly to actuators if they are digitally controllable, or transfer the value to a digital-to-analogue converter if the actuators are of analogue type. The numerical span of the displacement values can correspond to the numerical span defining an "off" state to an "on" state as described above. When moving between these two states the computing element or processor element can move through all the indexes of the table in a successive manner. This will accomplish a switching of the state of the OPS controlled in this manner in this example of embodiment. If a smooth movement is necessary, electronic filters used to filter the control signals, the speed the computing element or processor use when reading from the table can be used to control any aspect of the movements in an OPS system according to this example of embodiment of the present invention.

According to an example of embodiment of the present invention, the computing element or processor receives information, for example a message or signal, instructing the computing element or processor to put the OPS device according to the present invention in a certain state, wherein the state is as described above. In this manner it is possible to integrate an OPS device into an optical system, wherein signals generated elsewhere in the optical system can control the OPS device, for example as direct control signals or as a result of feedback conditions in a regulating loop feedback system.

The OPS device according to the present invention is a versatile, simple and robust optical device that can be used alone or in combination with any type of optical components used in an optical system assembly. Such optical systems or assemblies may comprise only one OPS device according to the present invention, a plurality of such OPS devices that are stacked or are individually positioned inside the optical system or optical assembly, intersecting for example one or a plurality of optical axis in the optical system or assembly. In the disclosure above, some examples of applications of the OPS device is described. However, these examples do not limit the scope of application of the OPS according to the present invention. For example, an OPS device can be used as a Variable Optical attenuator, for example in an optical fibre communication system.

It is within the scope of the present invention to be able use an OPS device if appropriate as claimed in the appended claim set in any type of application wherein light is used as a technical feature to achieve a certain technical functionality of a device, apparatus, or system etc.

The invention claimed is:
1. An Optical Power Switch (OPS) device, comprising:
an optical element having a first surface facing towards a second surface of a transparent soft material element, wherein the transparent soft material element is deposited onto a movable transparent support, wherein actuators reacting to an applied control signal are adapted to move the surface of the transparent soft material element towards the surface of the optical element, thereby changing at least one optical feature or optical parameter value of the OPS device, wherein based on the applied control signal, the surfaces of the optical element and the transparent soft material element are in a state of full contact or no contact therebetween, or an amount of specific areal overlapping contact between a part of an optical element surface area and a part of a soft material element surface area is provided.

2. The OPS device according to claim 1, wherein the optical element is movable, wherein the movement is controlled by actuators, and wherein the transparent soft material element deposited onto the transparent support is fixed.

3. The OPS device according to claim 1, wherein the optical element is movable, wherein the movement is controlled by a first actuator, wherein the transparent soft material element deposited onto the transparent support is movable, and wherein the movement is controlled by a second actuator.

4. The OPS device according to claim 1, wherein the optical element is made of a transparent soft material while the soft material element is omitted, the transparent support is used alone.

5. The OPS device according to claim 1, wherein the optical element is a concave lens.

6. The OPS device according to claim 1, wherein the optical element is a convex lens.

7. The OPS device according to claim 1, wherein the optical element is a prism with parallel surfaces.

8. The OPS device according to claim 1, wherein the optical element is a prism with non parallel surfaces.

9. The OPS device according to claim 1, wherein the first surface of the optical element and the second surface of the transparent soft material element respectively intersect an optical axis in the OPS device at a perpendicular angle relative to the optical axis.

10. The OPS device according to claim 1, wherein the first surface of the optical element and the second surface of the transparent soft material element respectively intersect an optical axis in the OPS device with a dip angle relative to the optical axis.

11. The OPS device according to claim 1, wherein a refractive index for the optical element material is equal to a refractive index for the transparent soft material element.

12. The OPS device according to claim 1, wherein a refractive index for the optical element material is different than a refractive index for the transparent soft material element.

13. The OPS device according to claim 1, wherein the OPS device is further adapted to transmit a message or external signal defining a state of the OPS device to a computing device in communication with the actuator, wherein the computing device is adapted to calculate a control signal level proportional to the transmitted state of the OPS device.

14. A macro lens system including an OPS device according to claim 1.

15. A zoom lens system including an OPS device according to claim 1.

* * * * *